United States Patent [19]

Kinsey et al.

[11] Patent Number: 4,842,239

[45] Date of Patent: Jun. 27, 1989

[54] OUTBOARD BOAT MOTOR SUPPORT DEVICE

[76] Inventors: Darrell Kinsey, Lindale; David Kinsey, Tyler, both of Tex.

[21] Appl. No.: 142,868

[22] Filed: Jan. 11, 1988

[51] Int. Cl.[4] .......................................... F16M 1/00

[52] U.S. Cl. .................................. 248/640; 280/414.1; 248/351; 248/354.5; 440/55; 440/900

[58] Field of Search ............... 248/640, 641, 642, 643, 248/354.5, 351; 440/900, 55; 280/414.1

[56] References Cited

U.S. PATENT DOCUMENTS

| | | | |
|---|---|---|---|
| 2,901,267 | 8/1959 | Holsclaw | 280/414.1 X |
| 2,939,670 | 6/1960 | Anderson | 248/351 |
| 2,977,084 | 3/1961 | Brown et al. | 248/351 |
| 3,355,136 | 11/1967 | Staples | 248/354.5 X |
| 3,693,576 | 9/1972 | Driscoll | 440/55 |
| 3,941,344 | 3/1976 | Paterson | 248/646 X |
| 3,952,986 | 4/1976 | Wells | 248/642 X |
| 4,125,236 | 11/1978 | Landwerlen | 248/640 |
| 4,331,431 | 5/1982 | Estes | 248/642 X |
| 4,438,899 | 3/1984 | Perkins et al. | 248/642 |
| 4,501,561 | 2/1985 | Speelman | 248/354.5 |
| 4,650,427 | 3/1987 | Huchinson | 248/354.5 X |
| 4,685,888 | 8/1987 | Brewer | 248/642 X |

*Primary Examiner*—Ramon O. Ramirez
*Attorney, Agent, or Firm*—Ronald B. Sefrna

[57] ABSTRACT

The present invention provides a device to support an outboard boat motor mounted on a boat during trailering of the boat and motor over the road, comprising an elongate support shaft adjustable in length, a U-shaped foot connected to one end of the support shaft, and a transverse engagement rod and bracket connected to the opposite end of the support shaft. The support device of the invention is designed to be disposed between the outboard motor and the boat trailer upon which the boat is positioned, with the U-shaped foot in engagement with the trailer and the transverse rod and bracket in engagement with the mounting bracket through which the outboard boat motor is pivotally interconnected to the transom of the boat, supporting the motor in an elevated position without imposing excessive stress on either the motor housing or the transom of the boat.

13 Claims, 2 Drawing Sheets

OUTBOARD BOAT MOTOR SUPPORT DEVICE

FIELD OF THE INVENTION

The present invention generally relates to a device for supporting an outboard boat motor in a tilted position relative to the transom of the boat, and more specifically relates to a device for supporting an outboard boat motor mounted to the transom of a boat by means of a pivotal mounting bracket, in a manner which prevents the imposition of excessive stress upon either the housing of the motor or the transom of the boat during trailering of the boat and motor.

BACKGROUND OF THE INVENTION

It is desireable, and has become common practice, during the trailer transporting of a boat and attached outboard motor over roads and highways, to tilt the motor on its mounting bracket into a position which elevates the motor as far from the road surface as possible in order to prevent impact of the motor against the road surface. Most modern outboard motors are equipped with tilt mechanisms, such as hydraulic piston-cylinder assemblies, and those tilt mechanisms are sometimes utilized to support the motor in an elevated tilt position during trailering. However, especially in view of the increasing size and weight of outboard motors, it is desireable to support the outboard motor independently of its tilt mechanism in order to avoid the imposition of forces which the tilt mechanism is not designed to accommodate. In response to the need for an effective means of supporting an outboard motor in an elevated tilt position a substantial number of different support device designs have been devised.

One type of support device which has been used is a shaft which is disposed between the motor housing and the transom of the boat upon which the motor is attached. Such devices typically utilize a V-shaped notch or cradle to engage the motor housing, and are attached to the boat transom with various types of brackets. This approach is exemplified by U.S. Pat. No. 2,977,084 to Brown, et. al., U.S. Pat. No. 4,650,427 to Huchinson, and, in a variation designed for use with inboard-outboard motors, U.S. Pat. No. 4,501,561 to Speelman. This approach affords a partial solution to the problem, but suffers from two distinct disadvantages. First, support of the motor by its housing, which is not designed to bear the weight of the motor, often causes structural damage to the motor housing, and usually results in marring the finish of the motor housing. Second, this approach imposes significant strains on the boat transom due to bouncing of the motor as the transport trailer passes over bumps and dips in the road surface, and tends to structurally damage the transom by imposing stresses the transom is not designed to accommodate.

Another approach is to dispose a similar device between the motor housing and the trailer upon which the boat and motor are transported. This approach is exemplified by U.S. Pat. No. 2,901,267 to Holsclaw, U.S. Pat. No. 3,941,344 to Paterson, U.S. Pat. No. 3,952,986 to Wells, and U.S. Pat. No. 4,125,236 to Landwerlen. Devices of this type do provide an improvement over the transom-mounted designs in that they eliminate the problem of stress and damage to the boat transom, but they do not address the significant problem of structural and finish damage to the motor housing.

Thus there remains a need for an outboard motor support device which provides a stable support for the motor in an elevated position without imposing excessive and damaging stress on either the motor housing or the boat transom.

SUMMARY OF THE INVENTION

The present invention provides a device which positively supports an outboard boat motor in an elevated tilt position relative to the transom of the boat to which such motor is attached. The device of the invention generally comprises an elongate shaft having a U-shaped foot at one end and an engagement rod and bracket disposed perpendicular to the elongate shaft attached to its opposite end. In the preferred embodiment of the invention, the elongate shaft includes a hollow outer shaft and an inner shaft to be received in the interior of the outer shaft in telescoping relation and retained by a pin extending through mating apertures in both shafts, making the length of the shaft adjustable. The engagement rod and bracket of the device comprise a cylindrical rod interconnected between the legs of a U-shaped plate with an elongate base and short parallel legs perpendicular to the base. The rod is interconnected to the shaft of the device, preferably by means of a V-shaped support attached to the shaft at the base of the "V" and attached to the rod at the end of each leg of the "V", in order to stabilize the position of the engagement rod and bracket relative to the shaft.

A typical outboard boat motor is mounted to the transom of a boat means of a motor mounting assembly which includes a bracket fixed to the boat transom and a swivel bracket in pivoting relation to the fixed bracket. The motor is mounted to the swivel bracket and is thus pivotally adjustable relative to the fixed bracket, for the purpose of adjusting the trim of the boat and motor in the water. The fixed bracket commonly includes a transverse stop rod to arrest the travel of the swivel bracket and motor forward toward the boat transom in response to the rearward force exerted by the motor's propeller. The swivel bracket includes notches designed and positioned to engage the stop rod of the fixed bracket, and often includes fingers in proximity to the notches to assist in proper engagement of the notches with the stop rod.

The engagement rod of the device is designed to fit into the notches of the swivel bracket of the motor mounting assembly, and thus support the weight of the motor at a point designed to bear the stress without damage. In use of the device, the motor and swivel bracket are elevated, the engagement rod is fitted with the notches of the swivel bracket, with any fingers on the swivel bracket extending into the space between the engagement rod and the interconnected U-shaped bracket, the U-shaped foot of the device is positioned upon the rear of the boat trailer, the shaft of the device is adjusted to the appropriate length to elevate the motor to the desired level, and the motor and swivel bracket are lowered with their weight retaining the device in position.

In an alternative embodiment of the device of the invention, designed to accommodate motor mounting assembly designs in which the U-shaped bracket of the preferred embodiment of the invention might interfere with proper seating of the engagement rod of the device with the notches of the swivel bracket, such U-shaped bracket is omitted from the device.

These and other features of the preferred embodiment of the device of the invention will be described in detail with reference to the accompanying drawing figures.

DETAILED DESCRIPTION OF THE INVENTION

Figure 1:
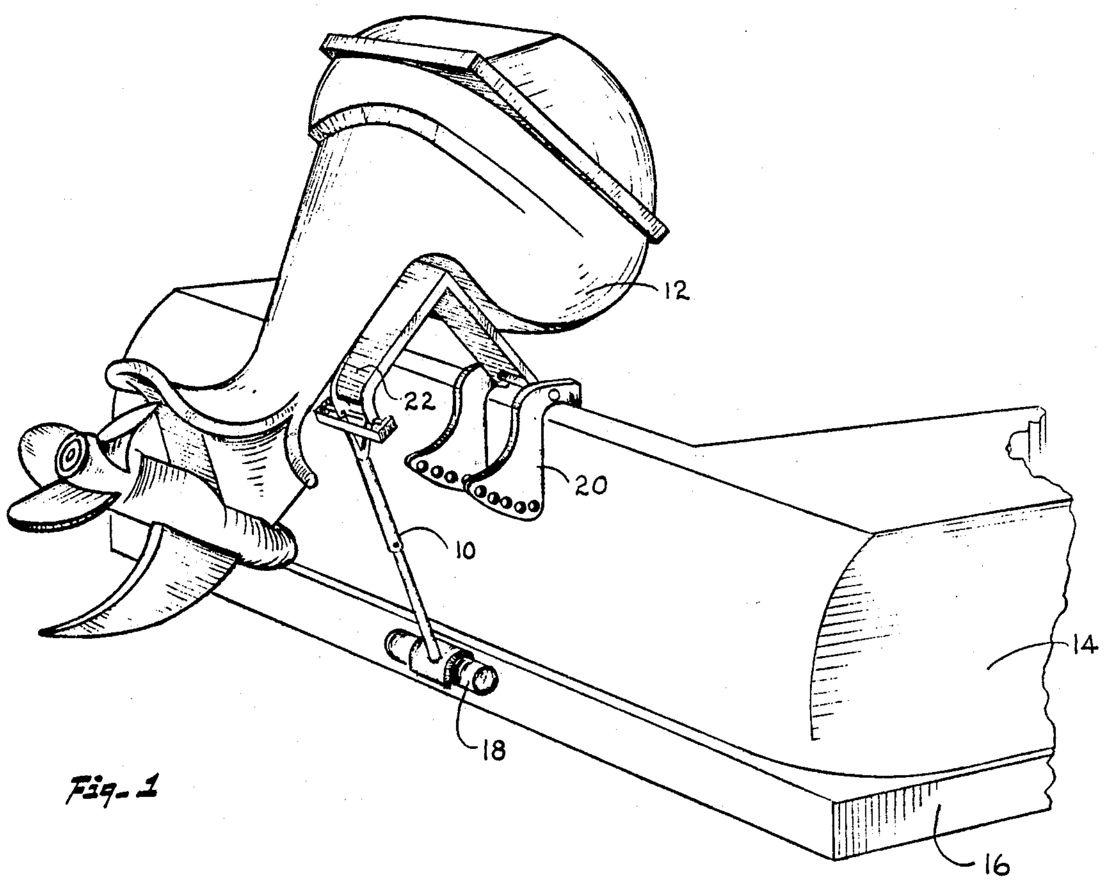
FIG. 1 is a perspective view of the preferred embodiment of the device of the invention in use with an outboard boat motor, boat, and trailer.

With reference now to FIG. 1 of the accompanying drawing figures, illustrating a typical use of the device of the invention, designated by reference numeral 10, device 10 supports outboard boat motor 12 in an elevated tilt position relative to boat 14 resting upon trailer 16, which is provided with a central roller 18. Motor 12 is pivotally interconnected to boat 14 by means of a motor mount assembly which includes fixed bracket 20 and swivel bracket 22, to which motor 12 is firmly attached. As illustrated, device 10 extends between swivel bracket 22 and roller 18 of trailer 16, but it will be understood that device 10 may be positioned with one end engaging the frame of a trailer which is not provided with a central roller 18.

Figure 2:
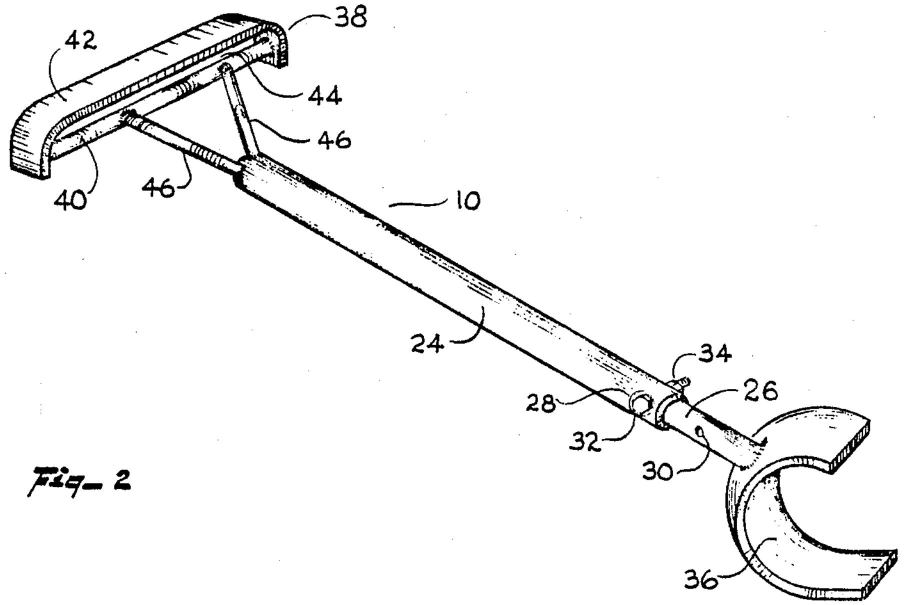
FIG. 2 is a perspective view of the preferred embodiment of the device of the invention.

Referring now to FIG. 2, device 10 will be seen to comprise an elongate shaft 24 which, in the preferred embodiment is a hollow cylindrical tube having a continuous side wall of sufficient thickness and strength to support the weight of motor 12 and swivel bracket 22. The preferred embodiment of device 10 further comprises cylindrical inner shaft 26 with an outside diameter slightly smaller than the inside diameter of shaft 24, to allow inner shaft 26 to be inserted into the interior of shaft 24 through one open end thereof in telescoping relation with shaft 24. Shaft 24 is provided with coaxially aligned apertures 28 penetrating its side wall near the open end of shaft 24, and inner shaft 26 is penetrated by a plurality of apertures 30 evenly spaced along its length. The overall length of device 10 is adjustable by matching an aperture 30 with apertures 28 and inserting pin 32 mutually therethrough to secure inner shaft 26 relative to shaft 24. Pin 32 is retained through apertures 28 and 30 by means of nut 34 in the preferred embodiment, although any other convenient securing means, such as a cotter pin (not shown) or a retainer clip (not shown) may be utilized.

Device 10 further comprises U-shaped foot 36 rigidly interconnected to the end of inner shaft 26 opposite the end of said inner shaft which is inserted into the interior of shaft 24. The legs of U-shaped foot 36 define a slot therebetween of appropriate size to receive roller 18 or, alternatively, a portion of the frame of trailer 16 during use of device 10.

Figure 3:
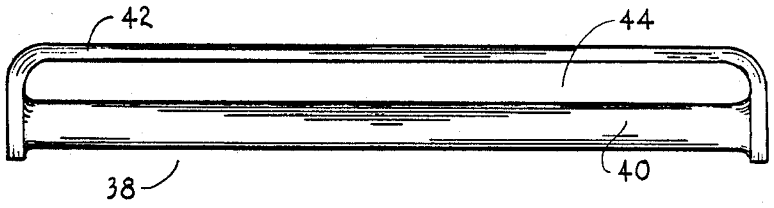
FIG. 3 is an end view of the engagement rod and bracket components of the preferred embodiment of the device of the invention.

Device 10 still further comprises swivel bracket engagement head 38, depicted in detail in FIG. 3, disposed at the opposite end of device 10 from foot 36 and rigidly interconnected to the end of shaft 24 opposite its open end into which inner shaft 26 is inserted. Engagement head 38 includes elongate rod 40 and U-shaped bracket 42. Bracket 42 comprises a U-shaped plate having a shallow base and short legs extending perpendicular to said base on the same side thereof. Rod 40 is rigidly interconnected between the legs of bracket 42 parallel to and disposed a short distance away from the base of bracket 42 so as to define slot 44 between said base and rod 40.

Engagement head 38 is interconnected to shaft 24 in perpendicular relationship therewith by interconnecting rod 40 to the end of shaft 24 opposite its open end into which inner shaft 26 is inserted. Although such interconnection may be made directly between the midpoint of rod 40 and said end of shaft 24, it is preferred that said interconnection be made by means of a pair of support rods 46 disposed in a "V" configuration between rod 40 and said end of shaft 24. In such preferred design support rods 46 are interconnected to each other and to said end of shaft 24 at one end of each of support rods 46 to form the base of said "V" configuration, and the opposite ends of support rods 46 are interconnected to rod 40 at spaced intervals intermediate the ends of rod 40. The resulting V-shaped or triangular support configuration increases the rigidity of the interconnection between engagement head 38 and shaft 24 and substantially eliminates the possibility that engagement head 38 will be forced out of perpendicular alignment with shaft 24 during use of device 10.

Device 10 is preferably constructed of a non-corrosive metallic material, such as stainless steel, to resist the deteriorating effects of fresh and salt water, having sufficient strength and rigidity to prevent deformation of the device in response to forces imposed during its use. Although stainless steel is the preferred material of construction, device 10 may be constructed of any material having the appropriate properties and characteristics for its intended use.

Figure 4:
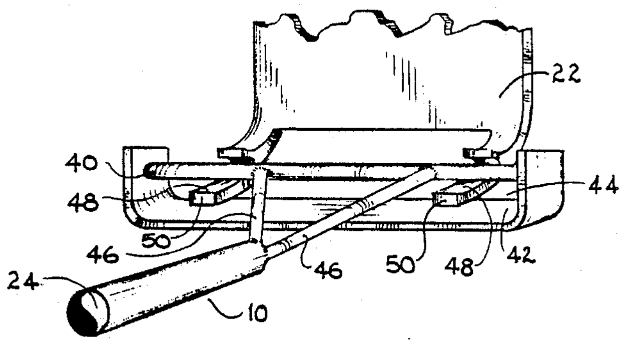
FIG. 4 is a view of the engagement rod and bracket components of the preferred embodiment of the device of the invention in engagement with the swivel bracket of an outboard boat motor mount assembly.

As noted above, motor 12 is attached to boat 14 by means of a motor mount assembly including a fixed bracket 20 interconnected to the transom of boat 14, and a swivel bracket 22 pivotally interconnected to the fixed bracket 20. Motor 12 is attached to swivel bracket 22 such that motor 12 and swivel bracket 22 are tiltable relative to fixed bracket 20 and thus relative to boat 12. In the typical design of such a motor mount assembly the forward travel of swivel bracket 22 toward fixed bracket 20 is restrained by means of a transverse stop rod, associated with fixed bracket 20, which is received in notches 48 of swivel bracket 22, depicted in FIG. 4. Swivel bracket 22 also typically includes fingers 50 associated with notches 48 to assist in bringing notches 48 into proper engagement with the stop rod of fixed bracket 20.

Figure 5:
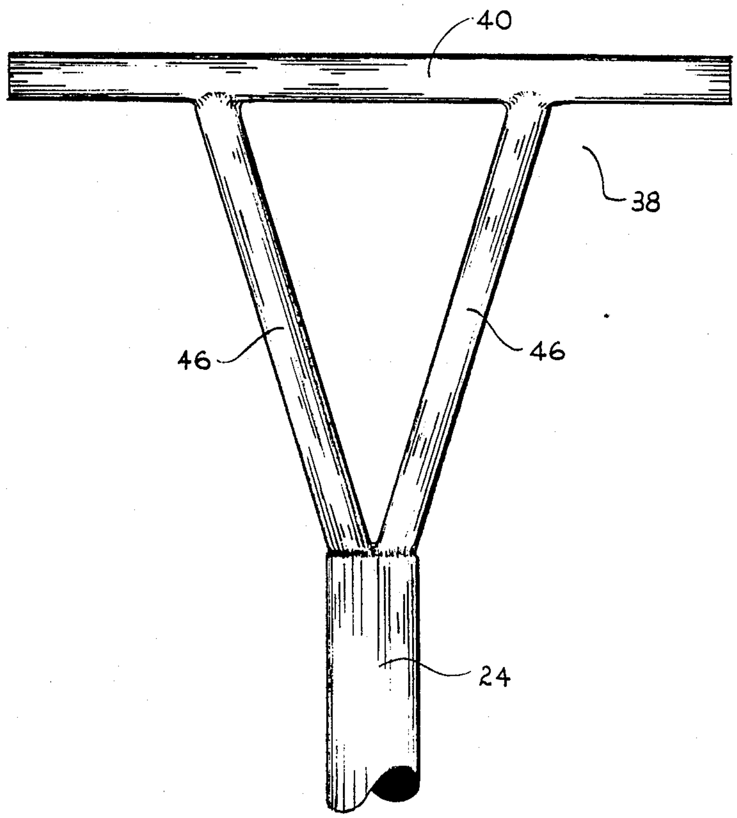
FIG. 5 is a plan view of the engagement head components of an alternative embodiment of the device of the invention.

In some motor mount assembly designs, swivel bracket 22 does not include fingers 50, and in an alternative embodiment of device 10 for use with such designs bracket 42 of engagement head 38 is omitted, as depicted in FIG. 5.

In using the device of the invention, with boat 14 in place upon trailer 16, motor 12 is raised to an elevated tilt position, either manually or by means of hydraulic trim piston-cylinder assemblies commonly utilized, and device 10 is positioned with rod 40 fitted into notches 48 and with fingers 50 extending into slot 44 of engagement head 38. If swivel bracket 22 does not include fingers 50, the alternative embodiment of device 10 may be employed, and rod 40 is similarly fitted into notches 48. Foot 36 is positioned to fit over and engage roller 18 or, alternatively, a frame member of trailer 16, the length of device 10 is adjusted as needed to maintain the elevation of motor 12 at the desired level, and motor 12, with swivel bracket 22, is lowered firmly against device 10. Device 10 is retained in position by the weight of motor 12, and may be secured by a strap (not shown) passed around motor 12 and interconnected at each end to engagement head 38. If motor 12 is equipped with trim assemblies, it may be additionally secured by actuation of such trim assemblies to force motor 12 and swivel bracket 22 firmly against device 10.

The foregoing detailed description of the preferred embodiment of the device of the invention is illustrative and not for purposes of limitation, and it will be readily understood that the device of the invention is susceptible to various alterations and modifications without departing from the scope and spirit of the invention.

What is claimed is:

1. For the purpose of supporting, in an elevated tilted position, an outboard boat motor mounted on a boat by means of a motor mounting assembly having a fixed bracket attached to the transom of the boat and a swivel bracket pivotally interconnected to the fixed bracket and with the outboard boat motor interconnected to the swivel bracket, with the boat on a boat trailer, an outboard motor support device comprising:

a rigid support means having first and second ends and having a longitudinal axis;

a swivel bracket engagement head, disposed at the first end of said rigid support means for engaging the swivel bracket of the motor mounting assembly, including a U-shaped plate having an elongate base and two short legs extending from the same face of said base perpendicular thereto, and an elongate cylindrical rod interconnected between said short legs of said U-shaped plate parallel to said base and spaced a short distance therefrom, with said elongate cylindrical rod disposed perpendicular to the longitudinal axis of said rigid support means and interconnected thereto such that the longitudinal axis of said rigid support means intersects said elongate cylindrical rod at its longitudinal midpoint; and trailer engaging means disposed at and interconnected to the second end of said rigid support means for engaging the rear of the trailer upon which the boat is placed.

2. The outboard motor support device of claim 1, wherein said rigid support means comprises an elongate shaft.

3. The outboard motor support device of claim 1, wherein said boat trailer includes a central transverse roller disposed at the rear of said boat trailer, and said trailer engaging means comprises a U-shaped plate adapted to be placed over said central transverse roller.

4. The outboard motor support device of claim 1, wherein said boat trailer includes a rear transverse frame member, and said trailer engaging means comprises a U-shaped plate adapted to be placed over said rear transverse frame member.

5. For the purpose of supporting an outboard boat motor in an elevated tilt position, with the outboard boat motor mounted on a boat by means of a motor mounting assembly having a fixed bracket interconnected to the transom of the boat and a swivel bracket, having a plurality of notches in the face of the swivel bracket facing the fixed bracket, pivotally interconnected to the fixed bracket and having the outboard motor attached to the swivel bracket, and with the boat disposed upon a trailer, an outboard motor support device to support the outboard motor through the swivel bracket of the motor mounting assembly without direct contact between the outboard motor support device and the outboard motor, comprising:

a first elongate shaft having a hollow interior, a first end, and an open second end;

a second elongate shaft having first and second ends, the first end of said second elongate shaft being inserted into the interior of said first elongate shaft through said second open end thereof in sliding relation therewith;

locking means for locking said first and second elongate shafts and preventing longitudinal movement of said first and second shafts relative to each other;

a swivel bracket engagement head interconnected to said first end of said first elongate shaft, for engaging the swivel bracket of the motor mounting assembly with the outboard boat motor attached thereto in an elevated tilt position, including a U-shaped plate having an elongate base and two short legs of equal length extending from the same face of said base in perpendicular relation thereto, and an elongate cylindrical rod disposed between said legs of said U-shaped plate and interconnected thereto in parallel relation to the base of said U-shaped plate and spaced a short distance therefrom, with said elongate cylindrical rod interconnected to said first end of said first elongate shaft such that the longitudinal axis of said first elongate shaft intersects the longitudinal midpoint of said elongate cylindrical rod; and trailer engaging means interconnected to said second end of said second elongate shaft, for engaging the rear of the trailer upon which the boat is disposed.

6. The outboard motor support device of claim 5, wherein said locking means comprises a pair of apertures penetrating said first elongate shaft near its open second end with their common axis perpendicular to the longitudinal axis of said first elongate shaft, a plurality of apertures disposed along the length of said second elongate shaft in coaxially aligned pairs each having their common axis perpendicular to the longitudinal axis of said second elongate shaft, and a locking pin to be received through said pair of apertures in said first elongate shaft and one pair of said apertures in said second elongate shaft.

7. The outboard motor support device of claim 5, wherein said trailer engaging means comprises a U-shaped plate to be placed over a portion of the trailer disposed at the rear thereof.

8. For the purpose of supporting, in an elevated tilt position, an outboard motor attached to a boat disposed upon a trailer having a rear transverse frame member with a central roller attached to the rear transverse frame member parallel thereto, with the outboard motor attached to the transom of the boat by means of a motor mounting assembly having a fixed bracket interconnected to the transom of the boat and a swivel bracket, including notches in the face thereof facing the fixed bracket, which is pivotally interconnected to the fixed bracket such that the outboard motor is attached to the swivel bracket and moves therewith, an outboard motor support device comprising:

an elongate shaft adjustable in length and having a first end and a second end;

a roller engaging member interconnected to said second end of said elongate shaft for releaseably engaging the central roller of the trailer; and a swivel bracket engagement head including an elongate cylindrical rod, with first and second ends, to be releaseably received in the notches of the swivel bracket of the motor mounting assembly with said swivel bracket and the outboard motor attached thereto in an elevated tilt position relative to the transom of the boat, said elongate cylindrical rod being interconnected intermediate its first and second ends to said first end of said elongate shaft in perpendicular relation to said elongate shaft, and further including a U-shaped plate with an elongate base and short legs extending in the same direction from said elongate base and perpendicular thereto, with each of said legs interconnected to an opposite end of said elongate cylindrical rod intermediate the ends of said legs such that said base of said U-shaped plate is parallel to said elongate cylindrical rod and spaced a short distance therefrom so as to define a slot between said base of said U-shaped plate and said elongate cylindrical rod.

9. The outboard motor support device of claim 8, wherein said elongate shaft includes a hollow female member with a first end and an open second end and having a pair of coaxially aligned apertures penetrating said female member near its open second end with the common axis of said apertures perpendicular to the longitudinal axis of said female member;

a male member with a first end and a second end and having a plurality of paired coaxially aligned apertures spaced along a portion of the length of said male member from its first end with their axes perpendicular the longitudinal axis of said male member, the first end of which is received in the interior of said female member in telescoping relation through said open second end of said female member; and a locking pin to be inserted through said pair of apertures in said female member and one pair of said apertures in said male member to interconnect said female member and said male member and prevent longitudinal movement of either of said members relative to the other.

10. The outboard motor support device of claim 8, wherein said roller engaging member comprises a flat plate formed into a U-shape having a base portion interconnected to said second end of said elongate shaft, and legs extending from said base away from said elongate shaft and defining a slot therebetween to receive the central roller of the trailer.

11. The outboard motor support device of claim 8, wherein said elongate rod of said swivel bracket engagement head is interconnected to said first end of said elongate shaft by means of a pair of short connecting rods of equal length, each having first and second ends, disposed in the shape of a V with the second ends of said connecting rods interconnected to each other and to said first end of said elongate shaft at the base of the V, and with the first ends of said connecting rods each interconnected to said elongate rod intermediate its ends.

12. The outboard motor support device of claim 8 wherein said device is constructed of a material resistant to the corrosive effects of both fresh water and salt water and of sufficient strength to support the weight of the outboard motor and swivel bracket.

13. The outboard motor support device of claim 12 wherein said material is stainless steel.

* * * * *